US008430940B2

(12) United States Patent
Nguyen

(10) Patent No.: US 8,430,940 B2
(45) Date of Patent: Apr. 30, 2013

(54) VACUUM SYSTEM FOR NAIL SALON WORK STATION

(76) Inventor: Huan Trong Nguyen, Butler, NJ (US)

(*) Notice: Subject to any disclaimer, the term of this patent is extended or adjusted under 35 U.S.C. 154(b) by 162 days.

(21) Appl. No.: 12/803,245

(22) Filed: Jun. 22, 2010

(65) Prior Publication Data

US 2012/0145004 A1 Jun. 14, 2012

Related U.S. Application Data

(60) Provisional application No. 61/269,289, filed on Jun. 23, 2009.

(51) Int. Cl.
*B01D 46/00* (2006.01)

(52) U.S. Cl.
USPC ......... 55/385.2; 55/DIG. 18; 454/56; 454/62; 454/63; 454/67; 454/57; 454/66; 454/49; 132/73; 132/73.5

(58) Field of Classification Search ................. 55/385.1, 55/385.2, 417, 467, DIG. 18, 473; 454/56, 454/62, 63, 67, 57, 66, 49; 132/73, 73.5, 132/200, 286; 95/8
See application file for complete search history.

(56) References Cited

U.S. PATENT DOCUMENTS 5,005,470 A 4/1991 Denker
5,336,128 A 8/1994 Birdsong
5,411,279 A * 5/1995 Magid ........................ 280/47.38
5,417,433 A * 5/1995 Phillips ......................... 273/309
5,562,286 A * 10/1996 Brinket ......................... 273/309
5,787,903 A 8/1998 Blackshear
5,922,130 A 7/1999 Mosser et al.
6,116,249 A * 9/2000 Tuffery ......................... 132/200
6,264,711 B1 * 7/2001 Smith .......................... 55/385.1
6,302,947 B1 10/2001 Rees, Jr.
6,338,675 B2 1/2002 Winelman
6,444,002 B1 * 9/2002 Mai ............................. 55/385.1
6,783,563 B1 8/2004 Eckhoff et al.
2003/0217675 A1 11/2003 Cheng
2007/0238404 A1 10/2007 Park et al.
2008/0216647 A1 * 9/2008 Phan .................................. 95/8
2012/0045981 A1 * 2/2012 Nguyen .......................... 454/49

* cited by examiner

*Primary Examiner* — Duane Smith
*Assistant Examiner* — Minh-Chau Pham
(74) *Attorney, Agent, or Firm* — Klauber & Jackson LLC

(57) ABSTRACT

A system for ridding the working area of a nail salon work station of fumes and nail dust. The system is self-contained within the particular work station and has a vacuum system that draws air in from the area surrounding and proximate the working area to remove the fumes and dust. A fan draws that air into a chamber containing a bag-type, particulate filter that filters out the nail dust. Downstream of the bag-type filter is a fume filter that receives the air from the bag-type filter, having been pressurized by the fan, and provides a filter of the fumes. The air, now having passed through a particulate filter and a fume filter is exhausted into the room at a location remote from the working area. The bag-type filter is inexpensive and readily replaced.

3 Claims, 1 Drawing Sheet

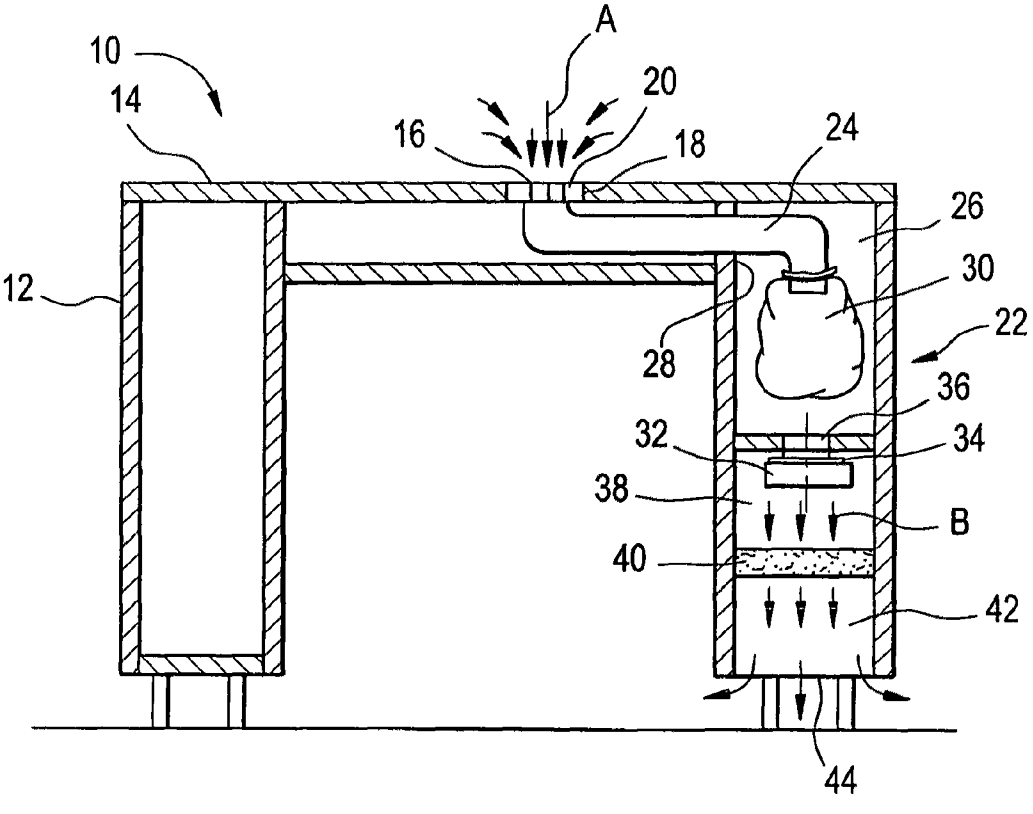
A
10
14
16
20
18
24
26
12
30
22
28
36
32
34
38
B
40
42
44

VACUUM SYSTEM FOR NAIL SALON WORK STATION

CROSS REFERENCE TO RELATED APPLICATIONS

This application claims the benefit of U.S. Provisional Application Ser. No. 61/269,289, filed Jun. 23, 2009.

BACKGROUND

The present invention relates to a vacuum system for a nail salon work station and, more particularly, to a system that rids the nail salon station of dust and fumes that are in the air within the working area.

In general, it is common to carry out the treatment of nails at a nail salon work station where the technician can have a convenient table top working area such that the customer can rest the hands while the technician carries out some procedure on the nails, such as a manicure etc.

With many procedures carried out on the nail, there is a need to grind or file the nails in order to shape them into the desired configuration, and that grinding creates dust from the nails that is annoying and readily inhaled by the technician and/or customer. In addition, there are normally fumes that are created in the course of a manicure, and a common fume is emitted by acrylic materials that are applied to the finger nails and are potentially harmful fumes if inhaled by the technician or customer.

As such, the technician is acting in an environment that is filled with the nail dust and fumes and it is an unpleasant working atmosphere. The customer, of course, also has to endure the undesirable atmosphere and, in general, it detracts from the otherwise good experience of the manicure.

It would therefore be advantageous to have a vacuum system located proximate to the work station that would efficiently and quietly eliminate the nail dust and fumes from the working environment.

SUMMARY OF THE INVENTION

Accordingly, the present invention relates to a vacuum system that can be incorporated into the nail salon work station so as to be a stand-alone system, that is, there is no need for further tubing, wiring and the like to connect the present system to some central vacuum system in the salon. The various components of the present vacuum system fit into the work station in an inconspicuous manner such that the overall work station remains neat and uncluttered and the system is sufficiently powerful that fumes and nail dust created at the working area where the nail procedure is being carried out on the customer are effectively removed and yet the present vacuum system is sufficiently quiet so as to not disturb the surrounding area.

With the present system, there is a nail salon work station that provides a working surface for the custom to rest the hand in a working area. There is an opening in the working surface covered by a screen or mesh and a vacuum system that draws the air proximate to the working area downwardly through the opening and through a bag-type filter and a fume removing filter. A fan is located downstream or upstream of the bag-type filter such that the fan draws the air through the opening and draws or forces that air through the bag-type filter. The fume filter is located downstream of the fan such that pressurized air is forced through the fume filter and out through an exhaust outlet into the salon room at a location remote from the working area.

With the present invention, therefore, the vacuum system is located within the work station itself and provides both a particulate filter that removes particulate matter such as nail dust and a fume removing filter, such as a carbon coated filter that removes the undesirable fumes from the stream of air such that the final discharge or exhaust of air from the work station is clean and not harmful to the individuals within the salon room.

These and other features and advantages of the present invention will become more readily apparent during the following detailed description taken in conjunction with the drawings herein.

BRIEF DESCRIPTION OF THE DRAWINGS

FIG. 1 is a side, cross sectional view of a nail salon work station constructed in accordance with the present invention.

DETAILED DESCRIPTION OF THE INVENTION

Referring now to the FIGURE, there is shown a side, cross sectional view of a nail salon work station 10. As can be seen, the work station 10 has a frame 12 with a working surface 14 at the top for the convenience of the technician and the customer such that the customer's hand can be rested on the working surface 14 and attended to by the technician.

As such, there is a working area 16 that is basically the location where the customer's hand or hands will be positioned while being attended to by the technician. As illustrated in the FIGURE, the location of the working area 16 is in the center of the working surface 14; however, it may be at any desired location along the working surface 14.

There is an opening 18 provided in the working surface 14 such that the air containing fumes and nail dust that is present proximate to the working area 16 can enter into the opening 18 as will be later explained. In one embodiment, the opening 18 can be covered by a grid 20, wire mesh or the like to prevent objects from accidentally falling into the opening 18. Typically the opening 18 can be about 4 inches in diameter.

A vacuum system, shown generally at 22, serves to draw the air containing fumes and nail dust into the opening in the direction of the arrows A, thereby clearing the working area 16 from the contaminants and providing a more pleasant environment for the technician as well as the customer.

The vacuum system 22 includes a duct 24 that is connected to the opening 18 so as to receiver the air containing fumes and nail dust and carry the fumes and nail dust into a chamber 26 that is formed within the frame 12 of the work station 10. The duct 24 is sealed within the chamber 26 along its entrance 28. According, one end of the duct 24 is connected to the opening 18 while there is a bag-type filter 30 located at the other end within the chamber 26. The bag-type filter 30, in the exemplary embodiment, is similar to a vacuum cleaner type of filter and which filters out the particulate matter, such as the nail dust, that enters through the opening 18. By the use of a bag-type filter 30, the filter can be readily available commercially, is inexpensive and can easily be replaced.

Thus the present bag-type filter 30 can be readily replaced and it is estimated that such replacement can be carried out on the order of every 2-3 days so it is important that the replacement be easy and the cost be low.

In an exemplary embodiment, a bag-type filter having a relatively low air resistance has been found applicable and may have 2 layers of filter i.e. the net and the sieve. The net is the first layer having a smooth surface so that particles can not be caught in it to so as to reduce the pressure drop caused by having too many particles caught in the filter. The sieve is to capture the small particles passing through the filter.

The vacuum system 22 also includes a fan 32 that is, as shown, located downstream of the bag-type filter 30 such that the inlet 34 of the fan 32 is located in a slight restriction 36 at the outlet of the chamber 26. As such, it can be seen that the fan 32 draws the air from the working area 16, through the duct 24, the bag-type filter 30 and out as shown by the arrows B creating a pressure within a secondary chamber 38. As an alternative, however, the fan could be located upstream of the bag-type filter 30 such that the fan forces the air through the bag-like filter 30 rather than drawing the air therethrough.

The fan, itself, may be of a variety of commercial fans, however, it has been found, in the exemplary embodiment, suitable fans include the XR Motorized Impeller Model XR 133-2810-11 and XR 190-2815-11 by the Continental Fan Company, a centrifugal blower, Model 50752-D500 and B24220 by Fasco Company or an inline exhaust fan, Model FR 100 by Fantech Company. Each of those fans is sufficiently powerful so as to draw in air within about 2-7 inches from the opening 18 and yet be very quiet in operation.

The pressurized air then passes through a fume filter 40 where the fume filter is of the type that can remove fumes from the air passing therethrough, such as a carbon-coated filter. In an exemplary embodiment, the fume filter 40 can be a pre-made carbon coated filter commercially available from Honeywell Company. The fume filter 40 does not need to be replaced as often as the bag-type filter and can be used without replacement for months.

The air, still pressurized, can then enter a final chamber 42 and proceeds out an exhaust outlet 44 to enter the room of the salon, it being noted that the exhaust of the air from the salon nail work station 10 is at a location remote from the working area 16 and thus a distance away from the area of the salon room where the air is being inhaled by the technician or the customer.

Those skilled in the art will readily recognize numerous adaptations and modifications which can be made to the salon nail work station of the present invention which will result in an improved system to protect the environment surrounding the working area, yet all of which will fall within the scope and spirit of the present invention as defined in the following claims. Accordingly, the invention is to be limited only by the following claims and their equivalents.

What is claimed is:

1. A nail salon work station having an upper working surface providing a working area for attending to the nails of a person, the work station comprising an opening formed in the upper surface proximate to the working area, a vacuum system adapt to remove fumes and dust through the opening, the vacuum system comprising a duct having one end in communication with the opening and having a bag filter located at the other end such that fumes and dust removed from the working area are trapped by the bag filter, a fan adapted to draw or force the fumes and dust through the duct and the bag-like filter, a carbon coated filter downstream of the fan or filter such that the fumes passing through the bag filter are forced by the fan through the carbon coated filter to be discharged through an opening to the surrounding environment, wherein the vacuum system is contained within the nail salon work station.

2. A method of withdrawing fumes and dust from a working area located above the working surface of a nail salon work station, the working surface having an opening, the method comprising the steps of providing a vacuum system contained within the nail salon work station having a vacuum pump to draw air surrounding the working area through the opening in the working surface, using a bag filter to filter out particulate matter from the air drawn through the opening, drawing or forcing the air by means of the vacuum pump through the bag filter, forcing the air passing through the bag filter through a carbon coated filter to filter out fumes from the air; and discharging the air passing through the carbon coated filter to the surrounding atmosphere at a location remote from the working area.

3. A vacuum system for use with a nail salon work station having a working surface and an opening in the working surface, the vacuum system comprising:

a vacuum system adapt to remove fumes and dust through the opening, the vacuum system comprising a duct having one end in communication with the opening and having a bag filter located at the other end such that fumes and dust removed from proximate the working surface are trapped by the bag filter, a fan to draw or force the fumes and dust through the duct and the bag filter, a carbon coated filter downstream of the fan such that the fumes passing through the bag filter are forced by the fan through the carbon coated filter to be discharged through an opening located remote from the working surface to the surrounding environment, wherein the vacuum system is contained within the nail salon work station.

* * * * *